United States Patent [19]

Nielsen

[11] Patent Number: 5,291,505
[45] Date of Patent: Mar. 1, 1994

[54] ACTIVE ENERGY CONTROL FOR DIODE PUMPED LASER SYSTEMS USING PULSEWIDTH MODULATION

[75] Inventor: Keith E. Nielsen, Redondo Beach, Calif.

[73] Assignee: Hughes Aircraft Company, Los Angeles, Calif.

[21] Appl. No.: 6,557

[22] Filed: Jan. 21, 1993

[51] Int. Cl.$^5$ ............................................. H01S 3/00
[52] U.S. Cl. ....................................... 372/38; 372/25; 372/10; 372/29; 372/26
[58] Field of Search ....................... 372/38, 25, 10, 29, 372/26

[56] References Cited

U.S. PATENT DOCUMENTS 5,144,631 9/1992 Okino ................................. 372/26

Primary Examiner—Léon Scott, Jr.
Attorney, Agent, or Firm—Michael W. Sales; Wanda K. Denson-Low

[57] ABSTRACT

An active energy control circuit and method employing pulsewidth modulation for use with diode pumped laser systems. The active energy control circuit and method employs optical energy feedback sensing and output control of the electrical pulsewidth to pump diodes of the laser system. This creates an active energy control loop for maintaining diode pumped laser output energy at a desired level over different pulse repetition frequencies, time, and environmental conditions. The diode pumped laser output energy is controlled by varying the pulsewidth of the output energy pulse while maintaining a current amplitude set point. By using a pulsewidth-modulation-based control system, the current applied to the pump diodes is regulated at an efficient set point below their damage level, and the pulsewidth is adjusted to maintain a desired output optical energy of the laser system. The pulse width modulated output energy control scheme provided by the present invention is appropriate for all diode pumped laser applications including laser rangefinders, laser designators, laser radar systems, laser welding systems, and other low and high power laser systems.

7 Claims, 2 Drawing Sheets

ACTIVE ENERGY CONTROL FOR DIODE PUMPED LASER SYSTEMS USING PULSEWIDTH MODULATION

BACKGROUND

The present invention relates generally to diode pumped laser systems, and more particularly, to an active energy control circuit and method employing pulsewidth modulation for use with such diode pumped laser systems.

Prior laser systems use flashlamp pumping and an associated active control of the laser output energy by increasing or decreasing the voltage and current to the flashlamp without changing the pulsewidth. Flashlamp pumped laser systems are less efficient than diode pumped lasers, requiring a larger power supply, and more thermal management in addition to requiring more input power to generate a similar laser output. The technique used in the flashlamp systems for active laser output energy control is inappropriate for a diode pumped system.

Diode pumped laser systems require keeping the current to the pump diodes below a maximum current damage level. The most efficient operating point however is near that maximum current level. In one laser development program of the assignee of the present invention, the actual setting for efficient laser operation is approximately 80 Amps, when the maximum current level is approximately 90 Amps. The approach previously used on this program was to use a current regulator (Buck converter) to keep the current regulated at an efficient set point below the damage level. The typical pump pulse to the laser diodes for a NdYag laser is on the order of 80 Amps for 200 microseconds. The active feedback for flashlamp pumping described above is not appropriate since increasing and decreasing the current to the pump diodes could result in damage to the pump diodes or loss in efficiency.

Accordingly, it is an objective of the present invention to provide for an active laser control system and method that employs feedback sensing of the optical output energy and output control of the electrical pulsewidth to pump diodes of the laser system to create an active energy control loop for maintaining diode pumped laser output energy at a desired level over different pulse repetition frequencies, time, and environmental conditions.

SUMMARY OF THE INVENTION

In order to achieve the above and other objective, the present invention provides for an active energy control circuit employing pulsewidth modulation for use with diode pumped laser systems. The diode pumped laser system comprises a laser cavity, a laser rod, a Q-switch, and a current controlled pulse drive circuit coupled to a plurality of pump diodes that pump the laser rod. In one embodiment, the control circuit comprises an optical to electrical sampling circuit for sampling the output energy of the diode pumped laser system and for converting sampled output energy into a digitized electrical signal. A controller is coupled to the sampling circuit which comprises logic for (a) setting an initial pulse duration of the pump diodes corresponding to a desired output energy level (threshold) of the diode pumped laser system, and (b) comparing the sampled output energy of the diode pumped laser system to the desired output energy level.

The controller generates a pulse duration update output signal that is derived from a logic routine that provides a longer duration pulse when the output energy level is below the desired threshold and providing a shorter duration pulse when the output energy level is above the desired threshold. The pulse duration output signal is adapted to increase or decrease the pulse duration of the pulse provided by the current controlled pulse drive circuit to the pump diodes, and whereby the controller is adapted to maintain the output energy of the diode pumped laser system at the desired output energy level.

The active energy control circuit employs optical energy feedback sensing and output control of the electrical pulsewidth to pump diodes of the laser system. This creates an active energy control loop for maintaining diode pumped laser output energy at a desired level over different pulse repetition frequencies, time, and environmental conditions. The diode pumped laser output energy is controlled by varying the pulsewidth of the output energy pulse while maintaining a current amplitude set point. This is an improvement over conventional active control systems used for flashlamp pumped lasers which increase or decrease the voltage and current to the flashlamp without changing the pulsewidth.

More specifically, one method in accordance with the present invention comprises the following steps. A desired initial pulse duration value for the output energy pulse of the diode pumped laser system is set. The output energy of the diode pumped laser system is sampled. The sampled output energy is converted into a digitized output energy signal. The digitized output energy signal is compared to a predetermined energy threshold. A control signal is generated that is indicative of increasing or decreasing the pulse duration value of the output energy pulse depending upon whether the sampled output energy is below or above the predetermined energy threshold, respectively. A new output energy pulse is then generated based upon the increased or decreased pulse duration value of the control signal. As a result, the output energy of the diode pumped laser system is maintained at a desired level.

In contrast to the control systems described in the Background section, by using a pulsewidth-modulation-based control system and method, the current applied to the pump diodes is regulated at an efficient set point below their damage level, and the pulsewidth is adjusted to maintain a desired output optical energy of the laser system.

The present pulse width modulated output energy control is appropriate for all diode pumped laser applications. These applications include: laser rangefinders, laser designators, laser radar systems, laser welding systems, and other low and high power laser systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
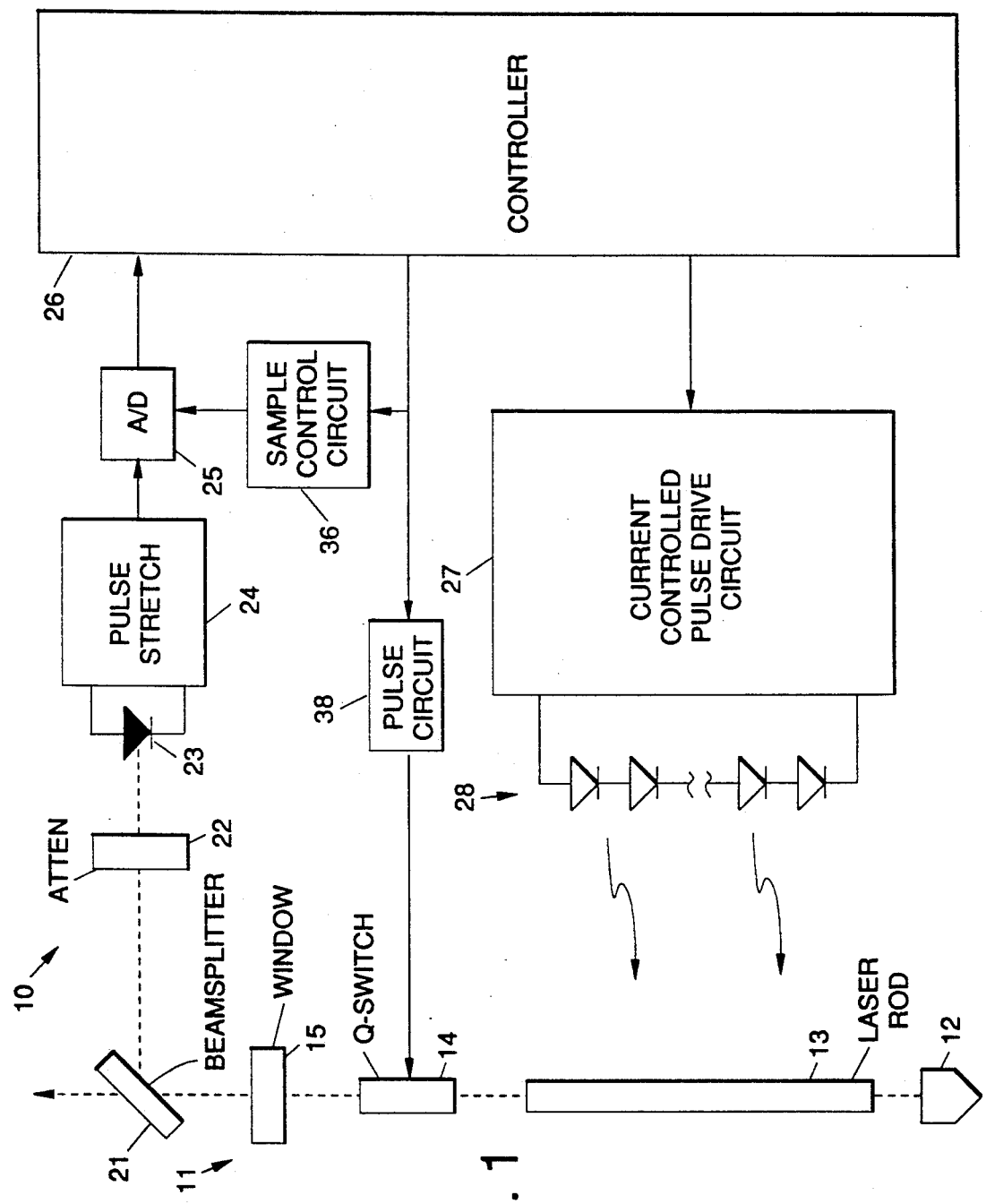
FIG. 1 illustrates an active energy control circuit in accordance with the principles of the present invention that employs pulsewidth modulation and which may be used with a diode pumped laser system.

Referring to the drawing figures, FIG. 1 illustrates an active energy control circuit 10 in accordance with the principles of the present invention that employs pulsewidth modulation and which is used with a diode pumped laser system 11. The diode pumped laser system 11 comprises a retroreflector 12, a laser rod 13, a Q-switch 14, and a partially transmissive output reflector 15.

The active energy control circuit 10 in accordance with the principles of the present invention comprises a beamsplitter 21, an optical attenuator/diffuser 22, an energy detector 23, such as a photodiode 23, that is coupled to a pulse stretching circuit 24, and an analog to digital converter (A/D) 25 coupled to the pulse stretching circuit 24. The A/D 25 is coupled to a controller 26 that implements pulsewidth-modulation-based control over the output energy of the laser system 11. The controller 26 is coupled to a current controlled pulse drive circuit 27 which is coupled to a plurality of pump diodes 28 that supply energy to the laser rod 13.

Figure 2:
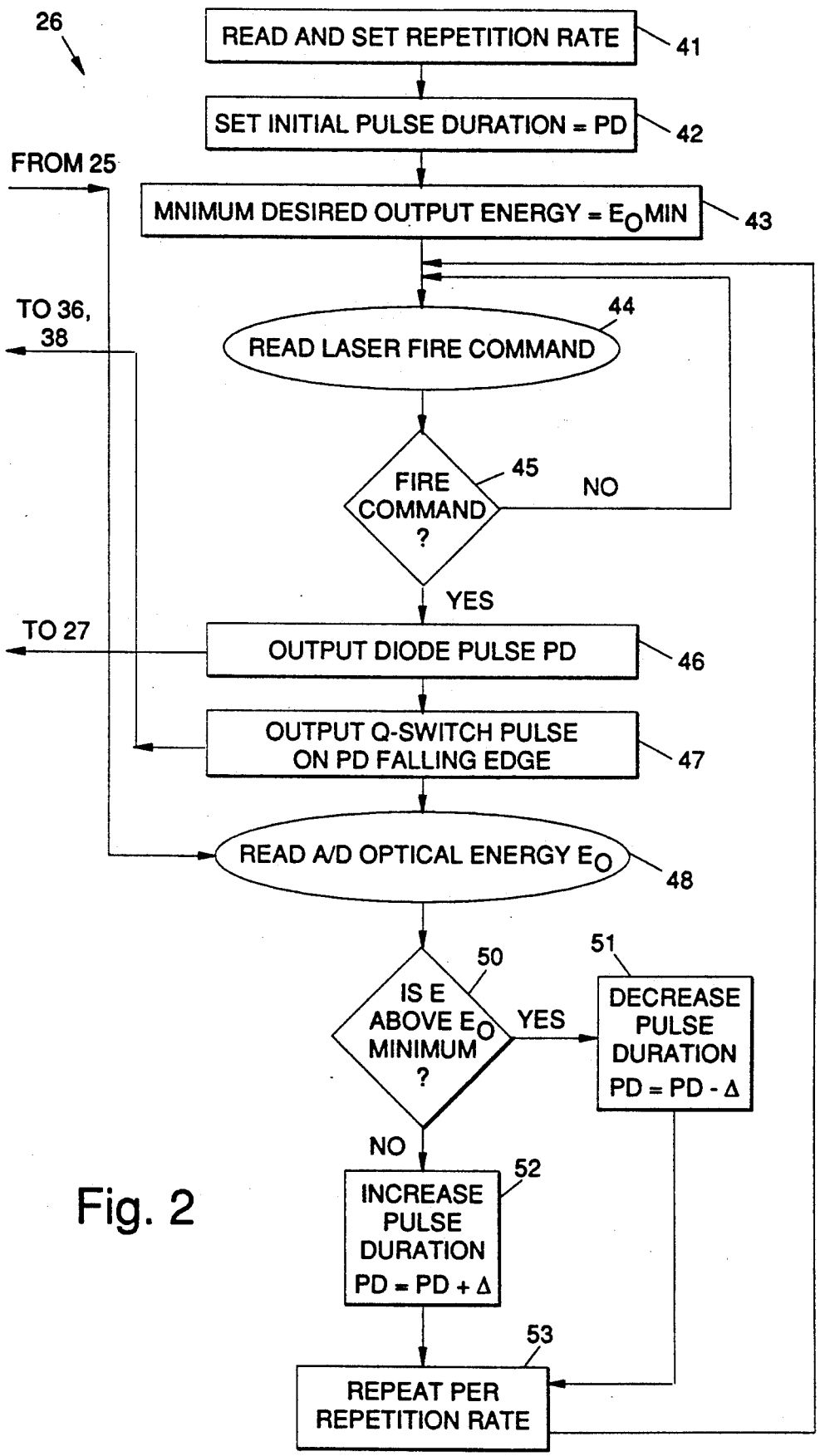
FIG. 2 shows the details of the controller employed in the active energy control circuit of FIG. 1.

Referring to FIG. 2, it shows the details of the controller 26 of the active energy control circuit 10 of FIG. 1. The controller 26 is comprised of a software-driven microcontroller that is adapted to control the output energy provided by the laser system 11 by controlling the pulse duration of the output pulse of the pump diodes 28. The controller 26 may be comprised of memory, sequencing logic, and output interface, and an input device, such as a keypad, for example.

Pulse repetition logic 41 is provided that is used to read and set the pulse repetition rate of the laser system 11. Initial pulse duration logic 42 is coupled to the pulse repetition logic 41 that is used to set the pulse duration the laser system 11. Minimum energy logic 43 is coupled to the initial pulse duration logic 42 that is used to set a minimum desired energy threshold or level, $E_{O\text{-}min}$, of the laser system 11. Firing logic 44, 45 is coupled to the minimum energy logic 43 that is used to control the firing of the laser system 11 to provide an output pulse therefrom.

Pulse duration setting logic 46 is coupled to the firing logic 45 and to the pulse drive circuit 27 that is adapted to couple a signal that sets the pulse duration of the laser pump diodes 28 through the pulse drive circuit 27. Q-switch logic 47 is coupled to the pulse duration setting logic 46, to a Q-switch firing pulse circuit 38, and to the sample control circuit 36, which is used to fire the laser system 11 and control the sampling of the output energy of the laser system 11. Sampling logic 48 is coupled to the Q-switch logic 47 and to the A/D 25 that is adapted to read the output energy of the laser system 11 from the A/D 25.

Threshold logic 50 is coupled to the sampling logic 48 and is adapted to determine if the output energy detected by the energy detector 23 is above the desired minimum output energy set in the minimum energy logic 43. The threshold logic 50 may be comprised of a conventional threshold detector, for example. Two output signals 51, 52 are provided from the threshold logic 50 for decreasing 51 and increasing 52, respectively, the pulse duration of the output energy from the pump diodes 28. Respective output signals 51, 52 are fed back through repeating logic 53 to the input to the firing logic 44 which repeats the sequence and is in turn coupled to the current controlled pulse drive circuit 27.

The repeating logic 53 couples the appropriate output signal 51, 52 to the firing circuit 44 which processes the above-described signals for each repetition rate. The selected signal 51, 52 establishes a new pulse duration PD that is fed back and becomes the control signal to the current controlled pulse drive circuit 27 that increases or decreases the current applied for the next pulse to the laser pump diodes 28.

The controller 26 may be constructed as a programmable logic array or gate array, for example, or may be implemented as a firmware or a software program that controls the operation of a microprocessor, for example. The hardware and logic that is used to implement the commands, store the initial pulse duration, and implement the thresholding and comparison circuitry described above is generally well-understood in the art and is routine to implement using the teachings contained in this description, and will not be described in detail herein.

In operation, the pulsewidth modulated active energy control circuit 10 or feedback loop, maintains the output energy of the diode pumped laser 11 at a desired level over different laser pulse repetition frequencies, times, and environmental conditions, for example. The following procedure is implemented in the controller 26.

Initially the laser system 11 is commanded by the controller 26 to fire with a set current amplitude (a typical setting is 80 amps), and a starting pump time set by the initial pulse duration logic 42 and provided to the current controlled pulse drive circuit 27 by the pulse duration setting logic 46. The firing of the laser system 11 is controlled by the Q-switch firing pulse circuit 38 which provides a pulse to the Q-switch 14 at the end of the pulse provided by the pulse drive circuit 27. The pulsewidth applied to the pump diodes 28 is typically about 200 microseconds wide. The laser system 11 fires when the controller 26 commands the pulse drive circuit 27 to generate the current pulse and commands the Q-switch firing pulse circuit 38 to fire the Q-switch 14.

When the laser system 11 (Q-switch 14) fires, a sample of the laser output energy is deflected by the beamsplitter 21 into the photodiode 23. The attenuator 22 provides sufficient attenuation in front of the photodiode 23 to ensure that it operates in a linear portion of its responsivity curve. Linear operation is desired because a saturated photodiode 23 does not indicate the true relative amplitude of the output pulse of the laser system 11, causing erroneous energy readings. A short duration electronic signal (approximately 20 nanoseconds) produced by the photodiode 23 in response to the output pulse of the laser system 11 is stretched in the pulse stretching circuit 24 to provide a wider pulse for measurement using the analog to digital converter (A/D) 25.

An analog pulse voltage is measured by taking an A/D sample at an appropriate time as commanded by the controller 26 and the sample control circuit 36. The sample is taken after an appropriate time delay from the Q-switch pulse using a sample control circuit 36. The controller 26 then compares the measured A/D sample with the desired output energy threshold, $E_O$min. If the energy contained in the A/D sample is greater than the desired output energy threshold then the controller 26 decreases the pump time for the next pulse generated by the pulse drive circuit 27. If the energy contained in the A/D sample is less than the desired energy threshold then the controller 26 increases the pump time for the next pulse generated by the pulse drive circuit 27. The incremental change in pump diode pulse duration is small compared with the pump diode pulsewidth (the incremental change, $\Delta$, is typically on the order of 5 to 10 microseconds).

The entire process is then repeated at the repetition rate of the laser for each desired output pulse, keeping the output energy of the laser system 11 at a substantially constant level.

Thus there has been described a new and improved active energy control circuit employing pulsewidth modulation for use with such diode pumped laser systems. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An active energy control circuit for use with a diode pumped laser system comprising a laser cavity, a laser rod, a Q-switch, a Q-switch firing pulse circuit, and a current controlled pulse drive circuit coupled to a plurality of pump diodes, and wherein the Q-switch generates an output energy pulse in response to a firing signal provided by the Q-switch firing pulse circuit, said control circuit comprising:
    optical to electrical sampling means for sampling the output energy of the diode pumped laser system and for converting the sampled output energy into a digitized energy signal;
    a controller comprising:
    pulse duration logic for setting a desired initial pulse duration of the output energy pulse of the diode pumped laser system;
    threshold logic coupled to the optical to electrical sampling means for comparing the digitized energy signal comprising the sampled output energy of the laser system to a predetermined energy threshold, and for providing output signals that are adapted to increase or decrease the pulse duration of the pulse provided by the current controlled pulse drive circuit depending upon whether the sampled output energy is below or above the predetermined energy threshold, respectively;
    pulse duration output logic coupled to the current controlled pulse drive circuit for providing an output signal that is adapted to set the pulse duration of the output energy pulse in the pulse drive circuit;
    laser firing logic coupled to the pulse duration output logic and to the Q-switch firing pulse circuit for causing the firing pulse circuit to generate the firing signal that is adapted to switch the Q-switch and generate the output energy pulse from the laser system; and
    whereby the controller is adapted to maintain the output energy of the diode pumped laser system at a desired level.

2. The control circuit of claim 1 wherein the optical to electrical sampling means comprises:
    a beamsplitter adapted to sample a portion of the output energy of the laser output pulse;
    an attenuator/diffuser adapted to attenuate and diffuse the laser output pulse to a predetermined and uniform level;
    an energy detector for detecting the attenuated laser output pulse and convert it to an electrical pulse;
    a pulse stretching circuit for electrically stretching the length of the pulse to provide a stretched pulse;
    analog to digital converter for converting the stretched pulse into a digital signal for processing by the controller; and
    a sample control circuit adapted to transfer the digital signal from the analog to digital converter to the controller.

3. An active energy control circuit for use with a diode pumped laser system comprising a laser cavity, a laser rod, a Q-switch, a Q-switch pulse circuit, and a current controlled pulse drive circuit coupled to a plurality of pump diodes, said control circuit comprising:
    optical to electrical sampling means for sampling the output energy of the diode pumped laser system and for converting the sampled output energy into a digitized energy signal;
    a controller comprising:
    repetition rate logic for setting a repetition rate of the laser system;
    pulse duration logic for setting a desired initial pulse duration of the output energy pulse of the pump diodes;
    threshold logic coupled to the optical to electrical sampling means for comparing the digitized energy signal comprising the sampled output energy of the laser system to a predetermined energy threshold, and for providing output signals that are adapted to increase or decrease the pulse duration of the pulse provided by the current controlled pulse drive circuit depending upon whether the sampled output energy is below or above the predetermined energy threshold, respectively;
    pulse duration output logic coupled to the laser firing logic and to the current controlled pulse drive circuit for providing an output signal that is adapted to set the pulse duration of the output energy pulse in the pulse drive circuit;
    laser firing logic coupled to the pulse duration output logic and to the Q-switch firing pulse circuit for causing the firing pulse circuit to generate the firing signal that is adapted to switch the Q-switch and generate the output energy pulse from the laser system; and
    whereby the controller is adapted to maintain the output energy of the diode pumped laser system at a desired level.

4. The control circuit of claim 3 wherein the optical to electrical sampling means comprises:
    a beamsplitter adapted to sample a portion of the output energy of the laser output pulse;
    an attenuator/diffuser adapted to attenuate and diffuse the laser output pulse to a predetermined and uniform level;
    an energy detector for detecting the attenuated laser output pulse and convert it to an electrical pulse;
    a pulse stretching circuit for electrically stretching the length of the pulse to provide a stretched pulse;
    analog to digital converter for converting the stretched pulse into a digital signal for processing by the controller; and a sample control circuit adapted to transfer the digital signal from the analog to digital converter to the controller.

5. A method for use with a diode pumped laser system comprising a laser cavity, a laser rod, a Q-switch, a Q-switch pulse circuit, and a current controlled pulse drive circuit coupled to a plurality of pump diodes, that is adapted to provide for active energy control of the laser system, said method comprising the steps of:

setting a desired initial pulse duration value for the output energy pulse of the pump diodes;

sampling the output energy of the diode pumped laser system;

converting the sampled output energy into a digitized output energy signal;

comparing the digitized output energy signal to a predetermined energy threshold;

providing a control signal indicative of increasing or decreasing the pulse duration value of the pump diode output energy pulse depending upon whether the sampled output energy is below or above the predetermined energy threshold, respectively;

generating a new pump diode output energy pulse based upon the increased or decreased pulse duration value of the control signal; and generating a new laser energy pulse from the energy stored in the laser rod from the prior pump diode pulse, which produces a corresponding increase or decrease in the energy of the new laser energy pulse;

whereby the output energy of the diode pumped laser system is maintained at a desired level.

6. The method of claim 5 wherein the step of generating a new laser output energy pulse comprises the steps of:

coupling the control signal to the current controlled pulse drive circuit; and switching the Q-switch in response to the control signal.

7. The method of claim 5 wherein the step of generating a new laser output energy pulse comprises the steps of:

setting a new pulse duration value in the current controlled pulse drive circuit based upon the increased or decreased pulse duration value of the control signal that is adapted to increase or decrease the pulsewidth output of the laser pump diodes; and switching the Q-switch in response to the control signal.

* * * * *